United States Patent [19]

Schrock

[11] Patent Number: 4,610,923

[45] Date of Patent: Sep. 9, 1986

[54] LAMINATED FABRIC STRUCTURE CONTAINING MICROSPHERES AND PROCESS FOR MAKING SAME

[75] Inventor: Fredric L. Schrock, Mishawaka, Ind.

[73] Assignee: Uniroyal Plastics Company, Inc., Middlebury, Conn.

[21] Appl. No.: 787,878

[22] Filed: Oct. 16, 1985

[51] Int. Cl.4 .......................... B32B 3/26; B32B 7/12
[52] U.S. Cl. .................................. 428/304.4; 156/79; 264/257; 428/313.5; 428/317.1
[58] Field of Search ................ 156/78, 79; 264/257; 428/304.4, 313.3, 313.5, 314.4, 314.8, 315.5, 315.7, 315.9, 317.1, 317.3, 317.7

[56] References Cited

U.S. PATENT DOCUMENTS 3,440,185  4/1969  Hanley ........................... 428/304.4
4,250,136  2/1981  Rex ................................. 264/257

Primary Examiner—William J. Van Balen
Attorney, Agent, or Firm—John A. Shedden

[57] ABSTRACT

This invention relates to the use of microspheres in laminated structures, particularly in foam-backed fabric laminates useful in the manufacture of upholstered items and processes for manufacturing same.

15 Claims, No Drawings

LAMINATED FABRIC STRUCTURE CONTAINING MICROSPHERES AND PROCESS FOR MAKING SAME

FIELD OF THE INVENTION

This invention relates to laminated structures, particularly foam-backed fabric laminates useful in the manufacture of upholstered items and processes for manufacturing the laminates.

BACKGROUND OF THE INVENTION

In the manufacture of upholstered items such as chairs, car seats and the like, many steps are necessary for contouring, fitting, cutting, etc., the outer coverings and final assembly of such items. More recently, ways have been found to reduce the number of manufacturing steps required for producing the outer structures of such items by vacuum forming the textile cover and applying to the back thereof a foamed elastomeric core by, for instance, pouring thereon a liquid foamable polyurethane composition. In such a process, however, the textile cover or laminate is often stretched to as much as 300 percent area increase resulting in an overall thickness of about 0.5 mil. In so doing, minute pin-holes in any part of the textile cover or backing are often enlarged significantly. The liquid foamable compositions have a tendency to seep through the interstices of the fabric to the outer surface causing disruption and discoloration of such surface. Such phenomenon is known as "strike-through", and it has been dealt with in the past by, for instance, applying to the back of the fabric a thin film of thermoplastic material such as nylon or poly(vinyl-chloride). Although "strike-through" was for all practical purposes eliminated, such adhered thermoplastic films give the fabric a boardy and uncomfortable feel, i.e. a poor hand. Many approaches have been tried to avoid the detrimental boardiness characteristic and yet have a laminate that also avoids the "strike-through" phenomenon described above.

German patent publication No. 3230321 (Meiller et al) discloses a padding laminate comprising a fabric to which is attached a foamed lining layer to whose outer surface is applied a foam core. Opposite to the fabric, the lining layer may be singed causing the top layer of the lining layer to melt and be compacted.

U.S. Pat. No. 4,353,955 (Cook) describes a method for applying polyurethane foam to a fabric wherein one surface of the fabric is treated with silicone surfactant; subsequently, an expandable polyurethane composition is affixed to the treated fabric surface and then the polyurethane is caused to foam.

U.S. Pat. No. 1,109,381 (Quertain) teaches a laminate structure of a fabric to which is adhered a ca. 2.5 mm thick foam, onto which is attached a thermoplastic film, the latter is held in a vacuum mold.

Canadian Pat. No. 973790 (Phillips) deals with a fabric to which is attached by adhesion a ca. 2 mm polyethylene foam. The laminar structure is then placed, fabric down into a vacuum mold and liquid foamable polyurethane is applied to the polyethylene foam.

U.S. Pat. No. 3,847,720 (Laberints) discloses a foamed polyurethane core and a microporous water proof polyurethane skin, at least a portion of said skin being covered by a fabric.

All of the above methods and laminar constructions realize some improvement in the flexibility of the fabric structures, however, they still provide laminate cushioning having uncomfortable bulkiness or boardiness due to either the necessary thickness of the closed cell foam attached to the fabric—if it were prepared in situ; to the adhesive layer used for the foam-to-fabric attachment; or to the inherent stiffness of the various barrier layers and/or adhesives proposed. As an aside, it is very difficult to generate closed cell foam in thin layers e.g. less than 3 mils to 8 mils in thickness, without realizing a very stiff material, for one needs a very high modulus binder system in the liquid layer to contain the gases being generated and thus maintain the closed cells. In the case of an open cell foam layer adjacent the fabric, it is extremely difficult to apply a liquid foamable composition, such as liquid foamable polyurethane, under vacuum forming conditions without having the inevitable "strike-through" of the polyurethane.

SUMMARY OF THE INVENTION

This invention provides the practitioner with a vacuum formable fabric that exceeds the prior art in the quality of aesthetics such as softness, hand and flexibility as well as ease of formability over a wide range of applications due to its extraordinary ability to elongate without loosing its resistance to "strike-through". In essence, these qualities are achieved by providing the back of a fabric with an expandable elastomeric layer having microspheres associated therewith.

DETAILED DESCRIPTION OF THE INVENTION

The instant invention relates to the discovery that if microspheres are incorporated into at least one of certain laminate layers of a stretchable fabric, said layers being affixed to the stretchable fabric prior to the application of a liquid foamable composition, extremely thin, soft and flexible laminate structures can be realized which avoid "strike-through" of the liquid composition.

The following laminar structures are included within the scope of this invention:

1. an expandable elastomeric microspheres-containing skin having attached thereto a stretchable fabric;
2. an elastomeric skin containing expanded microspheres, said skin having attached thereto a stretchable fabric;
3. an elastomeric skin containing expanded microspheres, said skin having attached thereto on one side a stretchable fabric and on the other side a foamed core;
4. an elastomeric skin to which is attached a stretchable fabric by means of an adhesive layer containing expandable microspheres;
5. an elastomeric skin to which is attached on one side a stretchable fabric by means of an adhesive layer, and on the other side a top coat, wherein at least one of said skin, said adhesive layer and said top coat contains expandable microspheres.
6. an elastomeric skin to which is attached on one side a stretchable fabric by means of an adhesive layer, and on the other side an elastomeric foamed core, at least one of said skin and said adhesive layer containing expanded microspheres;
7. an elastomeric skin to which is attached on one side a stretchable fabric by means of an adhesive layer, and on the other side a top coat having adhered thereto an elastomeric foamed core, at least one of said skin, said adhesive layer and said top coat containing expanded microspheres.

The laminar structures of this invention are extremely effective as barriers against "strike-through", although, not counting the thickness of the fabric, they are very thin even in the expanded state and do not detract the least from the characteristics inherent in the fabric such as hand, softness, flexibility and the like.

Generally, in the unexpanded state the skin may have a thickness of 0.5-6 mil (0.013-0.15 mm), preferably 0.75-5 mil (0.02-0.13 mm) and most preferably, 1.0-4 mil (0.025-0.10 mm). The optional adhesive layer between skin and fabric (including the adhesive which may have penetrated a portion of the fabric) may have a range of 0.5-7 mil (0.013-0.18 mm), preferably 0.75-6 mil (0.02-0.15 mm) and most preferably, 1-5 mil (0.025-0.13 mm). The optional top coat is applied at a thickness of 0.1-4 mil (0.0025-0.1 mm), preferably 0.25-3 mil (0.006-0.08 mm) and most preferably 0.3-2.5 mil (0.008-0.06 mm).

Although the laminar structures of this invention comprise a fabric and one or more layers, at least one of such layers containing expandable microspheres, it may not be necessary to cause expansion of such microspheres, yet, still be able to prevent "strike-through". However, it is advantageous to cause the microspheres to expand up to ten fold, preferably up to seven fold and usually up to 4 fold. Care should be taken that the total thickness of the expanded laminar structure (not counting the fabric layer) be less than 100 mil (2.5 mm), preferably no more than 80 mil (2 mm), most preferably no more than 60 mil (1.5 mm).

If the laminar structure of this invention comprises a fabric with one or more layers attached thereto, the microspheres may be present in all such layers, preferably in the adhesive layer and/or the top coat, most preferably only in the top coat.

In order to prepare the laminar structures of this invention, expandable microspheres may be added to any one of the laminar layers except the fabric at concentrations of 5-50%, preferably 7.5-40%, and most preferably, 11-30%, all by weight, and based on dry polymer composition. It will be appreciated that the concentration of microspheres as well as their degree of expansion are essentially determined by the size of pinholes to be covered in the skin, adhesive or top coat layers, especially upon stretching the laminate structure.

The laminar structures of this invention may be used for rather severe process and application conditions i.e. conditions beyond the capabilities of presently available "strike-through" preventing fabric backings without detrimentally affecting fabric characteristics. The increase of area forced upon the laminar structures of this invention is essentially limited to the stretchability of the fabric either mono-axially or bi-axially, i.e. the skin, adhesive or top coat layers may be able to expand beyond fabric expansion. In any case, the instant laminate structures may be expanded to a 400%, preferably 300%, and usually 200% area increase. Such increases in area are achievable even upon expansion of the microspheres, and it is believed that the heterogeneous expanded skin, adhesive or top coat layers have greater flexibility than known expanded homogeneous coatings, e.g. foamed polyurethane or foamed polyethylene.

The elastomeric skin ought to have relatively low modulus, therefore it should be composed of a high elongation elastomer having an ultimate tensile strength of at least 1000 psi, preferably at least 2000 psi; an elongation of at least 300%, preferably at least 400%: and a 100% modulus of 200 psi, preferably 300 psi. Suitable elastomers for skin application include polybutadienes, poly(butadiene-styrene) (SBR), carboxylated SBR, poly(butadiene-vinylpyridine),cis-polyisoprene, polychloroprene, natural rubber; poly(isobutylenebutadiene), ethylene-propylene-non-conjugated diene terpolymer, polyurethanes, poly(butadiene-acrylic acid), poly(butadiene-alkyl acrylate), chlorinated polyethylene, poly(epichlorohydrin); also thermoplastic elastomers such as block copolymers of styrene with butadiene or isoprene; also acrylated polyurethanes. These polymers may be applied to the back of a fabric either by calendering, extruding, etc., the dry polymer, or in the form of a latex or as a solution. In the latter two cases the excess water or solvent is driven off by suitable means. Where necessary, the above elastomers include additives such as tackifying agents, extender oils, curatives such as peroxides, sulfur and accelerators; antioxidants, antiozonants, processing aids and the like.

In order to facilitate or enhance adhesion between fabric and skin, an adhesive layer may be employed. Such adhesive layer should have a tensile strength of at least 250 psi, preferably at least 500 psi; a 100% modulus of at least 50 psi; preferably 100 psi; and an elongation at break of at least 300%, preferably 400% or more. These adhesives may be based on polychloroprene, poly(butadiene-acrylonitrile), polyurethane, natural rubber elastomers, and the like as disclosed in Adhesives 1978/79; The International Plastics Selector, Inc. (1977)

The optional top coat serves the purpose of providing a coating over the sometimes tacky or soft skin, making storage in a rolled-up fashion more convenient. The top coat also enhances overall strength of the laminar structure of this invention. Suitable top coats require elongation at break of over 100%, usually at least 200%, and ultimate tensile strength of 500 psi, preferably 1000 psi; and 100% moduli of at least 100 psi, preferably 200 psi, and they may be prepared using the same or similar elastomers as employed for the skin. Usually, the top coat includes a detackifying agent in order to prevent sticking of the top coat to fabric when being rolled-up for storage.

As already mentioned, at least one of the skin, adhesive and top coat layers may contain microspheres at certain concentrations. These microspheres have a non-expanded particle diameter of 1-25 microns, usually 2-20 microns with an average diameter of 8-10 microns, and they are capable of expanding up to 10 times the original diameter, although lower expansions can be achieved (e.g. 4-8 times) under proper conditions. Such microspheres are commercially available and comprise a shell made from polymers like poly(vinyl chloride), poly(methyl methacrylate), poly (vinylidene chloride) and the like; such spheres containing a low boiling liquid such as isopentane, neopentane, isobutane, usually in combination with a blowing agent, e.g. benzenesulfonyl hydrazide, toluene-sulfonyl hydrazide, oxybis(benzenesulfonyl hydrazide), azodicarbonamide and the like. Upon heating, expansion is accomplished by the evolution of gas from the low boiling solvents and/or by the decomposition of the blowing agent. Generally, such microspheres may be caused to expand at temperatures of 80°-160° C., usually 100°-140° C. Typical commercial microspheres are those manufactured by Alexander Research Company, Inc., (Multipolymer Corporation) and sold for example as product identified as SBA-PN, PL and PR or with binder added as Multispan - PI.

For the laminar structures of this invention, any vacuum moldable fabric may be employed, especially woven and knitted fabrics made from textured yarns, fabricated from polyester, polyamide, polyacrylic and the like thermoplastics. Preferably useful fabrics for this invention are stretchable in the warp and weft direction and are capable of being stretched to an area increase of 400% or more, usually 300% or more.

It should be emphasized that the expanded adhesive, skin or top coat layers are not intended to confer foam-like properties to the structures of this invention. The purpose of the microspheres, expanded or non-expanded, is to prevent "strike-through" of liquid foam core material while vacuum forming. Usually, layers, even if all are in the expanded state, are so thin that foam properties are hardly, if at all, noticeable.

Laminar structures of this invention having one or more expanded layers attached thereto, lend themselves as articles of commerce.

EXAMPLE 1

The following materials and compositions were provided:

| Fabric: | |
| --- | --- |
| Lycra [trademark]/polyester napped knit | |
| weight: 9 oz./sq. yd. (305 g/m$^2$) | |
| thickness: ca. 45 mil (1.14 mm) | |
| elongation at break: | |
| warp 208% | |
| weft 143% | |
| area increase, max.: ca. 300% | |
| Skin: | |
| Base polymer[1] (50%)* | 165 parts** |
| Polymeric flame retardant[2] (50%) | 35 parts** |
| Flame retardant[3] (93%) | 5.4 parts** |
| Carbon black (26%) | 5.8 parts** |
| Adhesive: | |
| Silicone binder (50%) | 110 parts |
| Modifier[4] (40%) | 37.5 parts |
| Polymeric flame retardant[2] (50%) | 60 parts |
| Flame retardant mixture[5] (57%) | 70 parts |
| Top Coat: | |
| Expandable polymer[6] (47%) | 197 parts |
| Leveling agent[7] (57%) | 9.8 parts |
| Antimony oxide (40%) | 12.5 parts |
| TiO$_2$ pigment (71%) | 0.7 parts |

REMARKS:
[1] Blend of modified polyurethane resins
[2] Poly(vinylidene chloride (80%)-acrylate (20%, wt)); 58%Cl
[3] Cyclic phosphonate ester
[4] Polyester polyurethane
[5] Mixture of Sb$_2$O$_3$, decabromodiphenyl oxide and cyclic phosphonate ester
[6] Blend of modified polyurethanes containing 7.4% microspheres
[7] Permuthane [trademark] KM-10-1610
*All weight percent concentrations as aqueous dispersions
**All parts by weight Onto a flat table was placed transfer coating paper and, by cast coating, a 5 mil thick layer of skin composition was spread evenly over the paper. The skin layer was dried for about 1.5 minutes at 200° F. (93° C.), resulting in a film of about 2.25 mil (0.06 mm) thickness. An about 6 mil (0.15 mm) thick film of the adhesive composition was spread over the dry skin layer, and, with the back down, the fabric was placed onto the wet adhesive layer using an about 60 mil (1.5 mm) nip clearance, causing about 50% of adhesive to penetrate the fabric. The resultant structure was placed in an air oven for about 2½ minutes at 200° F. (93° C.).

The transfer coating paper was removed from the skin, and with the fabric side down, the top coat composition was applied with a Mayer rod onto the back of the skin using 3 oz. per square yard (102 g/m2). The resultant assembly was dried for about one minute at 170° F. (77° C.). After drying, the following layer thicknesses were measured:

Skin: 2.3 mil (0.06 mm)
Adhesive: 3.5 mil (0.09 mm)
Top Coat: 1.5 mil (0.04 mm)
Total: 7.5 mil (0.19 mm)

A 16×16 inch (40.6×40.6 cm) sample of the above assembly was clamped into a frame and exposed to about 250° F. (120° C.) temperature for ca. 45 seconds causing the microspheres in the top coat to expand with the result that a laminar structure was obtained having a top coat with thickness of 6.5 mil (0.17 mm).

After cooling to room temperature, this laminar structure had excellent softness, flexibility and hand, hardly, if at all, distinguishable from the non-covered fabric. Said structure was now placed fabric face down on a test vacuum mold which is an inverted 4-stepped pyramid having an 8×8 inch (20.32×20.32 cm) base, 0.75 inch (1.9 cm) step height and 1.0 inch (2.54 cm) step depth; the top step being a 4 in$^2$ (6.45 cm$^2$) area, and the average area of expansion being 96 percent. An 18 inch Hg (ca. 61 kPa) vacuum was applied to the mold which pulled the laminar structure tightly against and into the mold. A total of 180 g of a two-part liquid polyurethane foam system (Elastoflex [trademark]C-2046U) was poured onto the back (top coat) of the structure, and the mold was closed. After about 3 minutes, the mold was opened, and the laminar structure supported by a foam core was removed.

Nowhere was there observed any "strike-through" of the polyurethane foam core material to the surface of the fabric. The pyramid-shaped cushion was very flexible, pleasing to the touch and very resilient to deformation.

EXAMPLE 2

Transfer coating paper is placed on a flat surface onto which is applied about a 6 mil (0.15 mm) thick layer of the skin composition of Example 1 containing 15% (weight) microspheres described in Example 1. Over the wet skin composition is placed the fabric (face up) using a roller having a nip clearance of 58 mil (1.38 mm). Subsequently, the laminar assembly is dried for about 3 minutes at 170° F. (77° C.). As described in Example 1, a 16×16 inch sample of the above assembly is locked into a frame and exposed to a temperature of about 280° F. (138° C.) for 35 seconds causing the microspheres to expand. After cooling to room temperature, the expanded assembly is treated in essentially the same fashion as outlined in Example 1 resulting in a foam core backed article exhibiting no "strike-through" on the fabric face.

EXAMPLE 3

Procedure of Example 2 is repeated with the exception that the skin containing 15% (weight) microspheres is dried on the transfer coating paper for about 2 minutes at 170° F. (77° C.) and the adhesive of Example 1 is then spread at about 6 mils (0.15 mm) film thickness on top of the skin and the fabric, with back down, placed onto the wet adhesive with a 60 mil (1.5 mm) nip clearance. This structure is oven dried for 3 minutes at 170° F. (77° C.). After cooling and stripping off paper, the assembly is vacuum formed as in Example 1 with no strike-through of the poured-in foam to the fabric face.

EXAMPLE 4

Procedure of Example 3 is repeated with the exception that the skin contains no microspheres (as in Example 1) and the adhesive of Example 1 contains 10% (weight) microspheres. Upon stripping, cooling, and vacuum forming, as in Example 1, no foam "strikethrough" to fabric face is observed.

Although the invention has been illustrated by the preceding examples, it is not to be construed as being limited to the materials employed therein, but rather, the invention encompasses the generic area as hereinbefore disclosed. Various modifications and embodiments can be made without departing from the spirit and scope thereof.

I claim:

1. A laminar structure comprising an expandable microspheres-containing elastomeric skin and a stretchable fabric attached thereto.

2. A laminar structure comprising an elastomeric skin to which is attached a stretchable fabric by means of an adhesive layer; at least one of the skin and the adhesive layer containing expandable microspheres.

3. A laminar structure comprising an elastomeric skin to which is attached on one side a stretchable fabric and on the other side an elastomeric top coat, at least one of said skin and said top coat containing expandable microspheres.

4. A laminar structure comprising an elastomeric skin to which is attached on one side a stretchable fabric by means of an adhesive layer and on the other side an elastomeric top coat, at least one of said skin, adhesive layer and top coat containing expandable microspheres.

5. The laminar structure of claim 1 wherein said microspheres are in an expanded state.

6. The laminar structure of claim 2 wherein said microspheres are in an expanded state.

7. The laminar structure of claim 3 wherein said microspheres are in an expanded state.

8. The laminar structure of claim 4 wherein said microspheres are in an expanded state.

9. A process for the production of laminated fabric structures comprising:
   affixing an expandable microsphere-containing elastomeric skin to a stretchable fabric to form a laminate; and
   expanding said microspheres in said laminate.

10. A process for the production of laminated fabric structures comprising:
    affixing an expandable microsphere-containing elastomeric skin to a stretchable fabric to form a laminate; and
    heating said laminate to expand said microspheres.

11. A process for the production of foamed laminated fabric structures comprising:
    affixing an expandable microsphere-containing elastomeric skin to a stretchable fabric to form a laminate;
    heating said laminate to expand said microspheres;
    vacuum forming said microsphere-expanded laminate in a mold;
    introducing liquid foamable composition onto said microsphere-expanded laminate in said mold;
    causing said composition to foam in a controlled manner; and
    removing said foamed laminated fabric structure from said mold.

12. A process for the production of laminated fabric structures comprising:
    affixing an elastomeric skin to a stretchable fabric by means of an adhesive layer to form a laminate wherein at least one of said elastomeric skin and said adhesive layer contains expandable microspheres; and
    expanding said microspheres in said laminate.

13. A process for the production of foamed laminated fabric structures comprising:
    affixing an elastomeric skin to a stretchable fabric by means of an adhesive layer to form a laminate wherein at least one of said elastomeric skin and said adhesive layer contains expandable microspheres;
    heating said laminate to expand said microspheres;
    vacuum forming said microsphere-expanded laminate in a mold;
    introducing liquid foamable composition onto said microsphere-expanded laminate in said mold;
    causing said composition to foam in a controlled manner; and
    removing said foamed laminated fabric structure from said mold.

14. A process for the production of laminated fabric structures comprising:
    affixing an elastomeric top coat to one side of an elastomeric skin;
    affixing a stretchable fabric by means of an adhesive layer to the opposite side of said elastomeric skin to form a laminate wherein at least one of said elastomeric topcoat, said elastomeric skin and said adhesive layer contains expandable microspheres; and
    expanding said microspheres in said laminate.

15. A process for the production of foamed laminated fabric structures comprising:
    affixing an elastomeric top coat to one side of an elastomeric skin;
    affixing a stretchable fabric by means of an adhesive layer to the opposite side of said elastomeric skin to form a laminate wherein at least one of said elastomeric topcoat, said elastomeric skin and said adhesive layer contains expandable microspheres;
    heating said laminate to expand said microspheres;
    vacuum forming said microsphere expanded laminate in a mold;
    introducing liquid foamable composition onto said microsphere-expanded laminate in said mold;
    causing said composition to foam in a controlled manner; and
    removing said foamed laminated fabric structure from said mold.

* * * * *